United States Patent Office 3,504,601
Patented Apr. 7, 1970

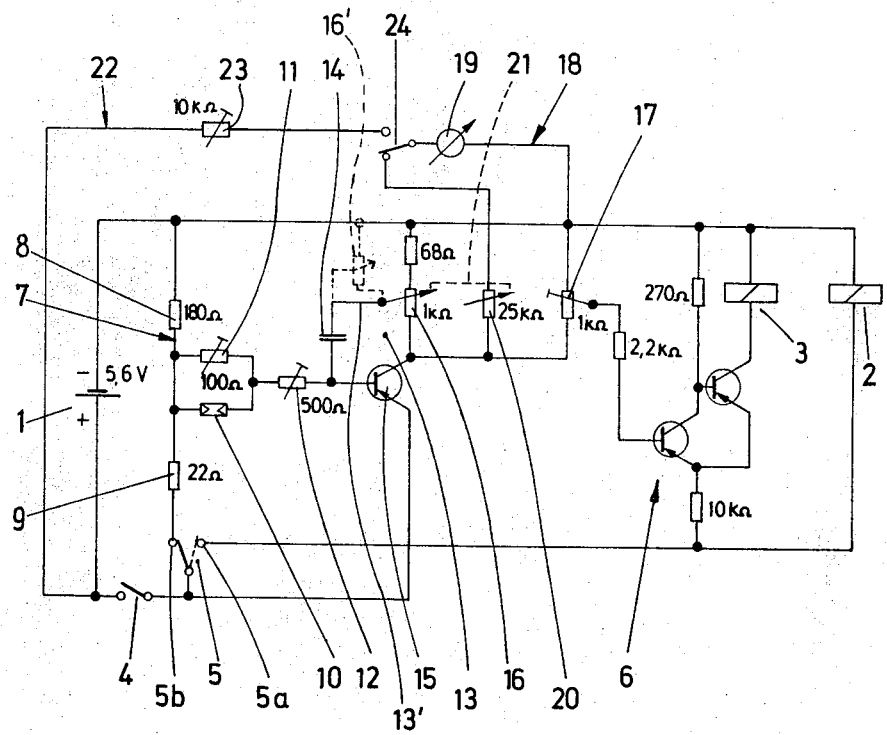

3,504,601
ELECTRONIC EXPOSURE CONTROL FOR A PHOTOGRAPHIC SHUTTER
Joachim Schubert, Munich-Solln, Germany, assignor to Ernst & Wilhelm Bertram, Munich-Pasing, Germany
Filed June 26, 1967, Ser. No. 648,803
Claims priority, application Germany, June 27, 1966, B 87,735
Int. Cl. G03b 7/08, 9/58
U.S. Cl. 95—10                                            4 Claims

ABSTRACT OF THE DISCLOSURE

An exposure control device for a photographic shutter wherein exposure factors such as aperture setting and film sensitivity are compensated for without effecting the photo resistance. The device contains a delay circuit comprising a release switch, a current source, a capacitor connected to the photo resistor, a sweep circuit arrangement connected at the output side to the capacitor, and electrical control members for responding to the exposure adjustment and/or film sensitivity. The delay circuit further includes a feed-back circuit containing therein the capacitor, at least one of the control members, and an amplifying element.

---

This inveniton relates to an exposure control device for a photographic shutter comprising a shutter opening member, the operation of which is started mechanically or by means of an opening electromagnet, and further comprising a shutter closing member, the operation of which is started by a closing electromagnet delayed in time with respect to the shutter opening member. Said closing electromagnet is controllable by a delay circuit comprising a release switch, a current source, a capacitor connected to a photo resistor, a sweep circuit arrangement connected at its output side to the capacitor, and electrical control members for responding to the exposure adjustment and/or the film sensitivity.

In known exposure control devices of this type the capacitor is directly connected in series to the sweep circuit arrangement. To achieve a delay in time sufficient for all cases, rather large capacitors are required, which are very difficult to arrange in photographic shutters. The control members for responding to the aperture adjustment and the film sensitivity are positioned in series in the known exposure control devices with or parallel to the photo resistance. The thus obtained control effect is not exact because the combination of photo resistor and control members has a different operational characteristic than the photo resistor alone.

It is also already known in exposure control devices to provide a controllable capacitor to feed additional exposure factors. However, such a capacitor is not being used in practice because of space requirements. Step switches are therefore provided which switch on a different fixed capacitor for each film sensitivity and/or aperture. This is also too expensive for a camera shutter and also requires too much space.

It is also known to respond to the film sensitivity or aperture by partially covering the photo resistance. The large sensitivity and aperture areas provided in modern cameras do not allow, however, or allow only under certain difficulties, the sweeping over of the total possible range of exposures by adjustable covering of the photo resistance.

The basic purpose of the invention is to construct an exposure control device of the above-described type in a way that a small capacitor is sufficient and the feeding of the exposure factors, aperture and/or film sensitivity, is possible without affecting the characteristic of the photo resistance. This is achieved according to the invention by providing the capacitor with an amplifying element in a feed-back circuit which at the same time contains a control member.

The combining of the capacitor with an amplifier in a feed-back circuit allows the use of a very small capacitor which itself together with the amplifier uses less space than the capacitors previously used. The feeding of the exposure factors, aperture and/or film sensitivity, into said feed-back circuit has no reactive effect on the characteristic of the photo resistance so that very exact control is possible.

The amplifying element is advantageously a transistor, a capacitor being interposed between its output and input and its output being connected to the sweep circuit arrangement.

According to a further advantageous embodiment of the invention, a testing apparatus is connected at the output side to the output of the amplifying element in a testing circuit parallel to the sweep circuit arrangement, a control member is arranged in the testing circuit, said control member corresponding to the control member in the feed-back circuit and connected with same mechanically for a joint adjustment, and a voltage divider arrangement is provided which can be switched on or off through a selector switch, the input of the amplified element at first being charged through said voltage divider arrangement for the testing indication with a voltage which is not sufficient to release the sweep circuit arrangement, while upon its switching off the voltage required for the release of the sweep circuit arrangement is applied to same. Said embodiment of the exposure control device makes possible an indication of the exposure conditions by using the same structural parts which are used for the control of the exposure time. Thus, without any great additional costs of construction, a control is possible which indicates whether or not pictures can be taken.

The arrangement is advantageously carried out in a way that the release switch and the selector switch are connected mechanically whereby upon a first switching step of the release switch, the selector switch is put into the position switching on the current divider arrangement while said selector switch is in a second switching step promptly enters into the position switching off the current divider arrangement. Thus, by moving the release switch the control reading can first take place and the shutter can then be immediately released.

The invention is disclosed more in detail by an embodiment described in connection with the accompanying drawing. The only figure in the drawing illustrates an electric circuit suitable for the exposure control device of the invention.

The circuit illustrated in the drawings has a source of current 1, for example a battery. An opening electromagnet 2 and a closing electromagnet 3 are to be energized by the battery 1. The electromagnet 2 is used to operate locking elements which are not illustrated, said locking elements freeing an opening movement of a photographic shutter, while the electromagnet 3 is used to control locking elements which upon their movement into release position start a closing operation. How this is done mechanically in detail is of no importance to the invention. Various types of shutters are known which have two locking elements controlling the release operation, said locking elements one after the other being brought into release position whereby the time interval between the release of both locking elements determines the exposure time.

The illustrated circuit diagram furthermore comprises a release switch 4 and a selector switch 5. Said release switch 4 and said selector switch 5 are connected mechanically in a way that upon closing of the release switch 4, in a first switch step the selector switch 5 remains in the position illustrated in full lines while said selector switch 5 in a second switch step enters promptly into the switching position indicated in dotted lines. The one contact 5a of the selector switch 5 is in direct connection with the opening electromagnet 2 and is in indirect connection through a sweep circuit arrangement 6, for example a Schmitt-trigger, with the closing electromagnet 3. The other contact 5b of the selector switch is connected to a voltage divider arrangement which is indicated at 7 and which comprises two fixed resistors 8 and 9.

The photo resistor 10 is in the usual manner exposed to the surrounding light. Potentiometer 11 and potentiometer 12 are used for balancing the characteristic of the photo resistor. A feed-back circuit 13 is connected at the output side to the photo resistor 10, said feed-back circuit including a capacitor 14 and a transistor 15 and furthermore comprising a potentiometer 16. The capacitor 14 and the potentiometer 16 are positioned between the output and the input of the transistor 15. The feed-back circuit 13 is connected between the output of the transistor 15 and the potentiometer 16 to the sweep circuit 6 through a potentiometer 17 allowing a basic adjustment of the delayed time. Said feed-back circuit 13 forms in the illustrated embodiment a so-called Miller-integrator.

An indicator 19 with a testing circuit 18 is connected to the output of the feed-back circuit 13, said indicator being parallel to the sweep circuit arrangement. The testing circuit 18 includes a potentiometer 20 which is mechanically connected with the potentiometer 16 for a joined adjustment as indicated by a dotted line at 21.

Finally, a battery testing circuit 22 with an adjustable resistor 23 is provided which by means of a switch 24 can be connected to the testing circuit.

The electrical values, which are advantageous for the single structural parts when a battery 1 of 5.6 v. is used, appear in the drawing.

The described circuit diagram operates for the control of the exposure time as follows:

The release switch 4 is open in the illustrated rest position and the entire circuit is inactive. When the shutter is to be operated, the combined switch 4, 5 is first brought into a first switching position in which position the release switch 4 is closed and the selector switch 5 remains in the position illustrated in full lines. Voltage is fed to the input of the transistor 15 through the voltage divider arrangement 7–9 and the photo resistor 10. The output of said transistor is thus supplied with a reinforced voltage, the amount of said voltage depending on the respective resistance value of the photo resistor and which voltage at first causes the indicator 19 to deflect. An adjusting element engages with the potentiometer 16, said adjusting element corresponding with the set aperture and/or the sensitivity of the film used. The potentiometer 20, which is mechanically connected as at 21 to the potentiometer 16, is adjusted correspondingly so that all information required for the exposure are supplied to the testing circuit 18. If the indicator 19 shows that a picture can be taken, the switch 4, 5 is moved on. Selector switch 5 moves to the position indicated in dotted lines in which position the contact 5a is in connection with the current source 1 through the release switch 4. The voltage divider arrangement 7–9 is thus turned off and the full operating voltage is applied to the transistor 15. The sweep circuit arrangement 6, like the opening electromagnet 2, is at the same time connected to the operating voltage. This immediately starts the opening of the shutter. The capacitor 14 which at first is charged only a little through the voltage divider arrangement 7–9 is now, due to the feed-back circuit 13 through the transistor, charged more strongly. The voltage at the output of the transistor 15 consequently increases an essentially greater amount which finally causes the following sweep circuit 6 to be switched over. From this moment on current flows through the closing electromagnet 3 and thus the closing function of the shutter is effected.

From the above description it can clearly be understood that the time period decisive for the exposure time between the opening electromagnet 2 and the closing electromagnet 3 depends on the size of the photo resistor 10 and the adjustment of the potentiometer 16. In this way, at least two exposure factors can be fed to the exposure control device.

In essentially the same manner, a further exposure factor can be fed to the feed-back circuit by arranging an additional potentiometer 16' which is indicated in dotted lines in the drawing. Same would have to be adjusted in the described manner whereby the conductor 13' would be deleted.

The invention is not limited to the illustrated embodiment. In place of an opening electromagnet 2 the shutter opening process can be done mechanically alone by means of the release switch. In place of the transistor 15 other electrical amplifying elements, for example tubes, can be used. It would also be possible to exchange the arrangement of the potentiometer 16 and of the photo resistor 10.

All characteristics disclosed in the description and the drawing can be inventive in any desired combination.

The embodiments of the invention in which an exclusive property or privilege is claimed are defined as follows:

1. In an exposure control device for a photographic shutter having a first shutter electromagnet and a second shutter electromagnet, the combination comprising:

a sweep circuit connected in series with said first shutter electromagnet, said sweep circuit having an input control terminal thereto, said series connected sweep circuit and first shutter electromagnet being connected in parallel with said second shutter electromagnet;

a series connected current source and switching means connected in association with said series connected sweep circuit and first shutter electromagnet and said second shutter electromagnet to selectively supply operating energy thereto;

amplifier means, the output of which is connected to said input terminal of said sweep circuit, a control member connected to the output of said amplifier means and being adjustable to correspond to exposure conditions;

a coupling capacitor and said control member serially connected between the output of said amplifier means and the control terminal of said amplifier means;

a photoresistor connected to said control terminal of said amplifier means and energizable by a selective control of said switching means, the characteristics of said photoresistor being free of any interference from said exposure conditions represented by corresponding adjustments of said control member, said switching means, in one condition, coupling said photoresistor and said coupling capacitor to said current source to charge said coupling capacitor to a magnitude sufficient to permit a current to flow at said output of said amplifier means but insufficient to affect said sweep circuit, said switching means, in a second position, disconnecting said photoresistor and said coupling capacitor from said current source and simultaneously connecting said current source to said series connected sweep circuit and first shutter electromagnet and said second shutter electromagnet to energize said second shutter electromagnet and to effect a change in the charge on said coupling capacitor to cause the output of said amplifier means to increase to a magnitude sufficient to effect a selectably delayed energization of said input terminal of said sweep circuit to cause a corresponding selectably delayed energization of said first shutter electromagnet.

2. The exposure control device defined in claim 1, wherein said amplifying means is a transistor.

3. The exposure control device defined in claim 1, including a testing circuit indicating exposure conditions connected to said output of said amplifier means and said current source, said testing circuit including a further control member mechanically interconnected to said control member; and including voltage divider means connected through said photoresistor to said control terminal of said amplifier means and said switching means, said voltage divider means supplying a limited voltage to said coupling capacitor to limit the magnitude of the output of said amplifier means to a level insufficient to energize said input of said sweep circuit.

4. The exposure control device defined in claim 3, wherein said switching means comprises a release switch and a selector switch, said release switch selectively connecting said current source to said selector switch and the input to said amplifier means, said selector switch having a first position wherein said current source is connected to said voltage divider means and a second position wherein said current source is disconnected from said voltage divider means and connected to said second shutter electromagnet and said series connected sweep circuit and first shutter electromagnet.

References Cited

UNITED STATES PATENTS

| | | |
|---|---|---|
| 2,978,970 | 4/1961 | Fahlenberg. |
| 3,063,354 | 11/1962 | Matulik et al. |
| 3,245,332 | 4/1966 | Kagan _____ 95—53 |
| 3,257,919 | 6/1966 | Sato et al. _____ 317—124 XR |
| 3,286,610 | 11/1966 | Fahlenberg. |
| 3,292,516 | 12/1966 | Sato et al. |
| 3,324,779 | 6/1967 | Nobusawa et al. _____ 317—130 |
| 3,336,850 | 8/1967 | Otani et al. |

NORTON ANSHER, Primary Examiner

J. F. PETERS, Jr., Assistant Examiner

U.S. Cl. X.R.

95—53; 250—206; 317—124, 148.5